(12) United States Patent
Oshima

(10) Patent No.: US 11,625,201 B2
(45) Date of Patent: Apr. 11, 2023

(54) TEMPLATE PROCESSING DEVICE, PRINT SYSTEM, PROCESSING METHOD OF TEMPLATE PROCESSING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Yoshinori Oshima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/217,324

(22) Filed: Mar. 30, 2021

(65) Prior Publication Data

US 2021/0303227 A1    Sep. 30, 2021

(30) Foreign Application Priority Data

Mar. 31, 2020    (JP) .............................. JP2020-062282

(51) Int. Cl.
*G06F 3/12*    (2006.01)
*G06K 15/02*    (2006.01)

(52) U.S. Cl.
CPC .......... *G06F 3/1204* (2013.01); *G06F 3/1257* (2013.01); *G06K 15/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0255100 A1* | 10/2011 | De Munck | ............. | B41J 3/4075 358/1.6 |
| 2013/0184845 A1* | 7/2013 | Hales | ..................... | G05B 15/02 700/97 |
| 2013/0188207 A1* | 7/2013 | Shiohara | ............... | G06F 3/1206 358/1.9 |
| 2014/0092409 A1* | 4/2014 | Ito | ......................... | G06F 3/1204 358/1.11 |
| 2017/0286030 A1* | 10/2017 | Matsui | ................. | H04N 1/4406 |
| 2020/0406635 A1* | 12/2020 | Yasui | ..................... | G06F 3/1253 |
| 2020/0409714 A1* | 12/2020 | Qian | ..................... | G06F 9/5077 |
| 2021/0055900 A1* | 2/2021 | Ruan | ..................... | G06F 3/1205 |
| 2021/0118048 A1* | 4/2021 | Correa Bahnsen | | G06Q 30/0282 |

(Continued)

FOREIGN PATENT DOCUMENTS

| | | |
|---|---|---|
| JP | 2007-249787 A | 9/2007 |
| JP | 2014-071583 A | 4/2014 |
| JP | 2017-068536 A | 4/2017 |

*Primary Examiner* — Helen Zong
(74) *Attorney, Agent, or Firm* — Oliff PLC

(57) ABSTRACT

A template processing device includes a selection reception unit that receives selection of a template from available templates, a text input reception unit that receives an input of a text into the selected template, a storage control unit that stores the selected template and a related text that is at least a part of the input text in a storage unit in association with each other, a keyword input reception unit that receives an input of a search keyword for searching the template, an extraction unit that extracts, from the storage unit, the template with which the related text corresponding to the input search keyword is associated, and a display control unit that displays the extracted template on a display unit as an available template.

6 Claims, 13 Drawing Sheets

(56) References Cited

U.S. PATENT DOCUMENTS

2021/0149611 A1* 5/2021 Shinagawa ........... G06F 3/1243
2021/0296005 A1* 9/2021 Takahashi .............. G16H 50/20
2021/0397786 A1* 12/2021 Henmi .................... G06F 16/00

* cited by examiner

FIG. 5

| TEMPLATES | RELATED TEXTS | | |
|---|---|---|---|
| TEMPLATE A | CAUTION | | |
| TEMPLATE B | WARNING | | |
| TEMPLATE C | NO SMOKING | | |

FIG. 6

| TEMPLATES | RELATED TEXTS | | |
|---|---|---|---|
| TEMPLATE A | CAUTION | DANGER | |
| TEMPLATE B | WARNING | | |
| TEMPLATE C | NO SMOKING | | |

TEMPLATE PROCESSING DEVICE, PRINT SYSTEM, PROCESSING METHOD OF TEMPLATE PROCESSING DEVICE, AND NON-TRANSITORY COMPUTER-READABLE STORAGE MEDIUM STORING PROGRAM

The present application is based on, and claims priority from JP Application Serial Number 2020-062282, filed Mar. 31, 2020, the disclosure of which is hereby incorporated by reference herein in its entirety.

BACKGROUND

1. Technical Field

The present disclosure relates to a template processing device, a print system, a processing method of the template processing device, and a non-transitory computer-readable storage medium storing a program.

2. Related Art

JP-A-2017-068536 discloses an operation terminal including a storage unit that stores a plurality of templates formed by allocating printing objects in a predetermined format, a reception unit that receives an operation for selecting a plurality of printing objects, and a display unit that, after sequential order are provided to the plurality of templates stored in the storage unit based on a reception result at the reception unit, displays the plurality of templates in that order. With this configuration, the operation terminal allows a user o to easily search a template.

In searching for templates, there is a case where the user wants to search the template that the user used before. In such a case, the user often remembers the text input to the template. However, in hitherto known techniques, the user cannot search for the template based on the text that the user input when the user used the template.

SUMMARY

A template processing device according to an aspect of the present disclosure includes a selection reception unit that receives selection of a template from available templates, a text input reception unit that receives an input of a text into the selected template, a storage control unit that stores the selected template and a related text that is at least a part of the input text in a storage unit in association with each other, a keyword input reception unit that receives an input of a search keyword for searching the template, an extraction unit that extracts, from the storage unit, the template with which the related text corresponding to the input search keyword is associated, and a display control unit that displays the extracted template on a display unit as an available template.

A print system according to another aspect of the present disclosure includes an information processing terminal and a tape printer. The information processing terminal includes a selection reception unit that receives selection of a template from available templates, a text input reception unit that receives an input of a text into the selected template, a storage control unit that stores the selected template and a related text that is at least a part of the input text in a storage unit in association with each other, a keyword input reception unit that receives an input of a search keyword for searching the template, an extraction unit that extracts, from the storage unit, the template with which the related text corresponding to the input search keyword is associated, a display control unit that displays the extracted template on a display unit as an available template, a print data generation unit that generates print data by using the template that is selected from the available templates, and a transmission unit that transmits the generated print data to the tape printer. The tape printer includes a reception unit that receives the print data from the information processing terminal and a print unit that performs printing based on the received print data.

A processing method of a template processing device according to still another aspect of the present disclosure executes processing including receiving selection of a template from available templates, receiving an input of a text into the selected template, storing the selected template and a related text that is at least a part of the input text in a storage unit in association with each other, receiving an input of a search keyword for searching the template, extracting, from the storage unit, the template with which the related text corresponding to the input search keyword is associated, and displaying the extracted template on a display unit as an available template.

According to still another aspect of the present disclosure, a non-transitory computer-readable storage medium storing a program causes the template processing device to execute processing including receiving selection of a template from available templates, receiving an input of a text into the selected template, storing the selected template and a related text that is at least a part of the input text in a storage unit in association with each other, receiving an input of a search keyword for searching the template, extracting, from the storage unit, the template with which the related text corresponding to the input search keyword is associated, and displaying the extracted template on a display unit as an available template.

BRIEF DESCRIPTION OF THE DRAWINGS

FIG. 5 shows one example of template data.

FIG. 6 shows a state in which a related text is added to the template data of FIG. 5.

DESCRIPTION OF EXEMPLARY EMBODIMENTS

A template processing device, a print system, a processing method of the template processing device, and a non-transitory computer-readable storage medium storing a program according to embodiments of the present disclosure will be explained below with reference to the drawings. Note that, although an XYZ orthogonal coordinate system is presented in FIGS. 1 to 3, this coordinate system is merely used for convenience of explanation and does not limit the following embodiments.

Overviews of Tape Printer and Ribbon Cartridge

Figure 1:
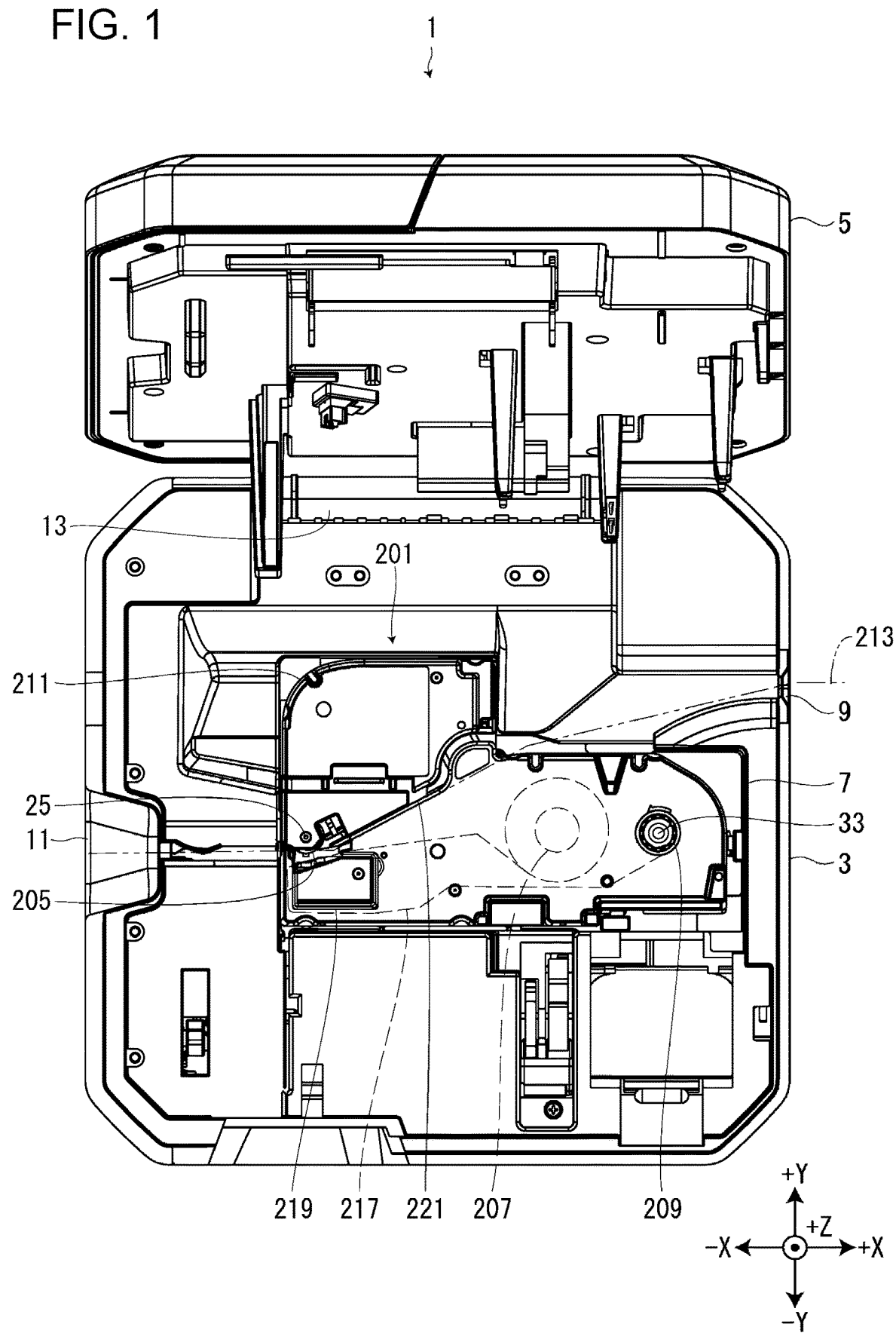
FIG. 1 is a tape printer, in which a ribbon cartridge is provided in a cartridge attachment section viewed from the front side of the attachment direction.

As shown in FIG. 1, a tape printer 1 includes a device case 3 and an attachment section cover 5. The device case 3 is formed into a nearly rectangular parallelepiped shape. On the positive Z direction of the device case 3, a cartridge attachment section 7 is provided. A ribbon cartridge 201 shown in FIG. 2 is provided in the cartridge attachment section 7.

On the surface in the positive X direction of the device case 3, a tape insertion opening 9 is provided. When the ribbon cartridge 201 is provided in the cartridge attachment section 7, a print tape 213 that is delivered from a tape roll (not shown) provided outside the tape printer 1 is inserted from the tape insertion opening 9. On the surface in the negative X direction of the device case 3, a tape ejection opening 11 is provided. The print tape 213, which is inserted from the tape insertion opening 9, is ejected from the tape ejection opening 11. The attachment section cover 5 opens and closes the cartridge attachment section 7. The attachment section cover 5 is provided on the device case 3 so as to be rotatable around a hinge portion 13, which is provided at an end section in the positive Y direction of the device case 3.

Figure 2:
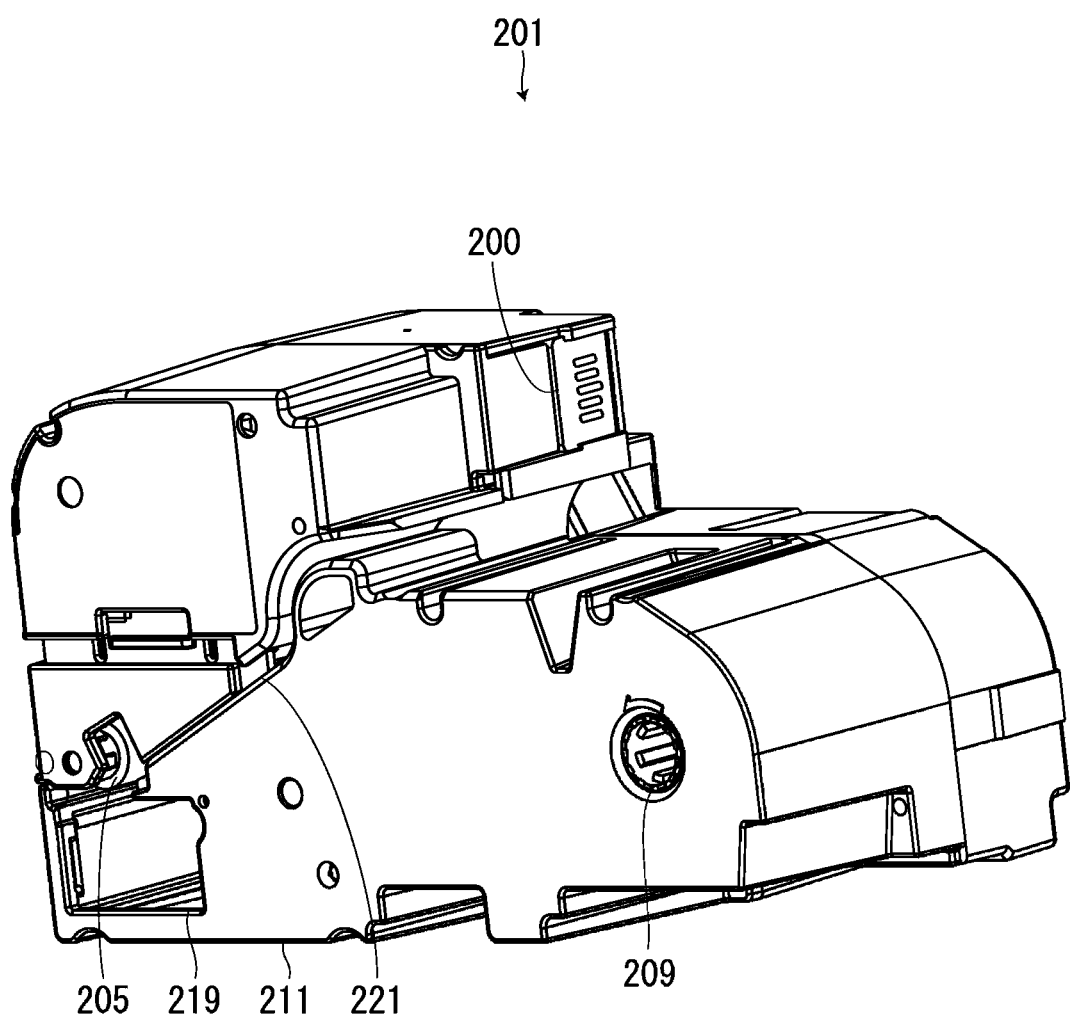
FIG. 2 is a perspective view of the ribbon cartridge.

As shown in FIGS. 1 and 2, the ribbon cartridge 201 includes a platen roller 205, a feed core 207, a take-up core 209, and a cartridge case 211 storing them. An ink ribbon 217 is wound around the feed core 207. The ink ribbon 217 delivered from the feed core 207 is wound up on the take-up core 209. The cartridge case 211 is provided with a head insertion hole 219 penetrating in Z axis. The cartridge case 211 is also provided with a tape route 221. The print tape 213 inserted from the tape insertion opening 9 is delivered to the tape ejection opening 11 through the tape route 221.

Figure 3:
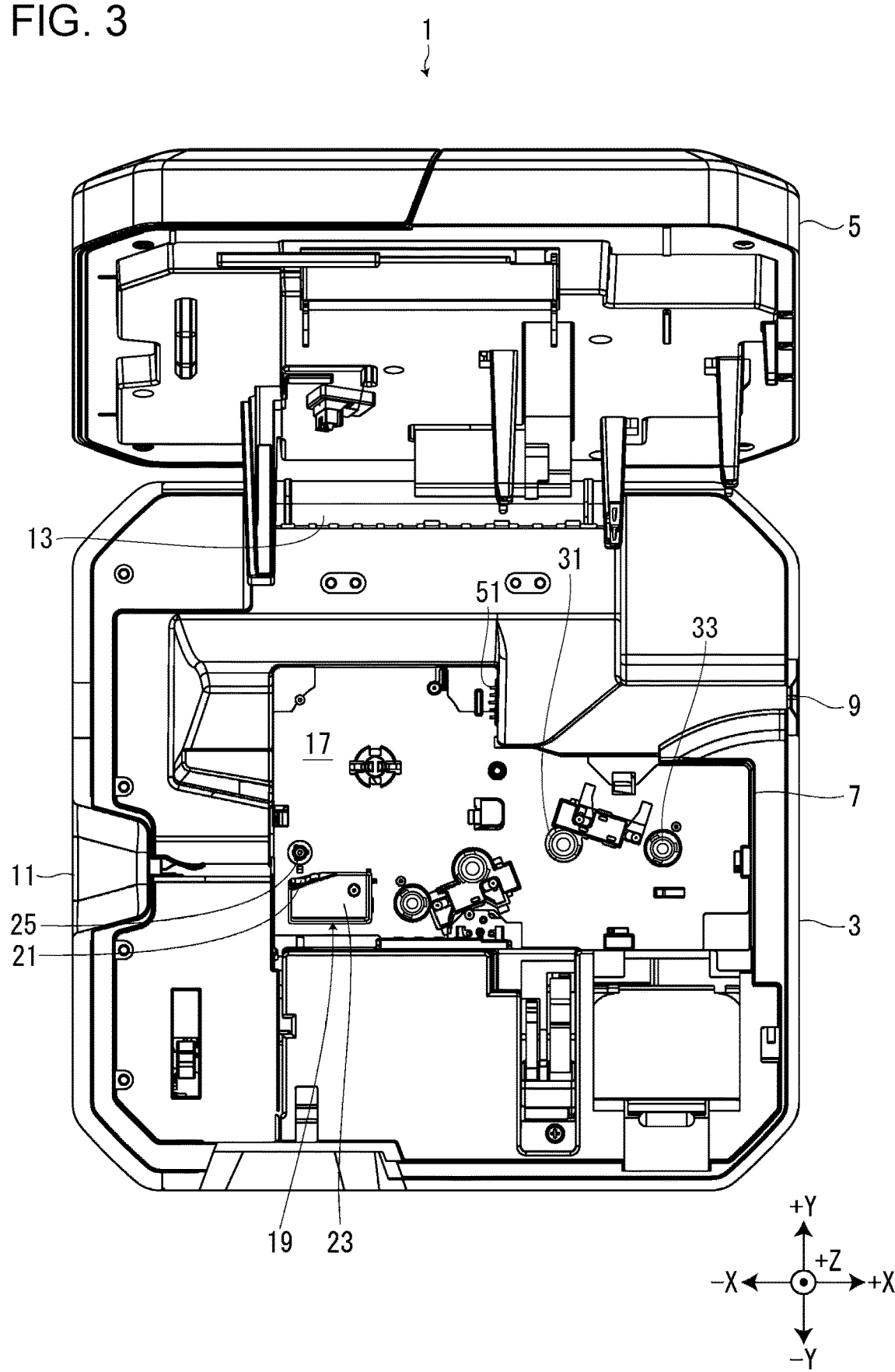
FIG. 3 is the tape printer, in which a ribbon cartridge is not provided in the cartridge attachment section, viewed from the front side of the attachment direction.

As shown in FIG. 2, the cartridge case 211 has a long shape in X axis, when viewed from the positive Z direction. In addition, the cartridge case 211 is provided with a circuit substrate 200 on an outer surface thereof at a position contacting with a circuit substrate connection portion 51, which is shown in FIG. 3, of the cartridge attachment section 7. The circuit substrate 200 stores cartridge information, which will be described later.

Note that, the tape roll that delivers the print tape 213 is assumed to be used together with the ribbon cartridge 201, and thus the tape roll and the ribbon cartridge 201 are sold together as a set. Therefore, the length of the print tape 213 of an unused tape roll and the length of the ink ribbon 217 stored in an unused ribbon cartridge 201 have approximately the same length.

Cartridge Attachment Section

As shown in FIG. 3, the cartridge attachment section 7 is formed into a recessed shape having an opening in the positive Z direction. A bottom of the cartridge attachment section 7, or an attachment bottom 17 that is a face in the negative Z direction, is provided with a head portion 19, projecting in the positive Z direction. The head portion 19 includes a thermal print head 21 and a head cover 23 covering faces of the thermal print head 21 in at least the positive X direction, the negative Y direction, and the positive Z direction. The head cover 23 projects in the positive Z direction, and is inserted into the head insertion hole 219 to guide installation of the ribbon cartridge 201 when the ribbon cartridge 201 is provided in the cartridge attachment section 7. The attachment bottom 17 is also provided with, in order from the negative X direction, a platen shaft 25, a feed shaft 31, take-up shaft 33 projecting in the positive Z direction.

The platen shaft 25 is provided at a place on the positive Y direction of the thermal print head 21. The platen shaft 25 is inserted into the platen roller 205 to guide, together with the head cover 23, installation of the ribbon cartridge 201 when the ribbon cartridge 201 is provided in the cartridge attachment section 7. Note that the attachment direction of the ribbon cartridge 201 is an extending direction of the platen shaft 25, that is, the direction parallel to Z axis.

When the ribbon cartridge 201 is provided in the cartridge attachment section 7, the platen shaft 25, the feed shaft 31, and the take-up shaft 33 are respectively inserted into the platen roller 205, the feed core 207, and the take-up core 209, as shown in FIG. 1. When the attachment section cover 5 is closed in this state, the thermal print head 21 is shifted toward the platen shaft 25 by means of a head shift mechanism. By shifting the thermal print head 21, the print tape 213 and the ink ribbon 217 are held between the thermal print head 21 and the platen roller 205. By heating the thermal print head 21 while delivering the print tape 213 and the ink ribbon 217 by rotating the platen roller 205, the tape printer 1 prints on the print tape 213 based on print data transmitted from a portable terminal 400 shown in FIG. 4. The portable terminal 400 is one example of the "template processing device".

The circuit substrate connection portion 51 is provided on a side surface of the cartridge attachment section 7 at substantially the center in X axis. When the ribbon cartridge 201 is provided in the cartridge attachment section 7, the circuit substrate connection portion 51 is connected to the circuit substrate 200, shown in FIG. 2, provided on the ribbon cartridge 201.

The circuit substrate connection portion 51 reads cartridge information from the circuit substrate 200. The cartridge information includes information on the print tape 213 and the ink ribbon 217. For example, the cartridge information includes information on the length of the print tape 213 in an unused tape roll, information on the length of the ink ribbon 217 stored in an unused ribbon cartridge 201, information on colors of the print tape 213 and the ink ribbon 217, information on the widths of the print tape 213 and the ink ribbon 217, information on a material of the print tape 213, and information on a type of the print tape 213. The type of the print tape 213 indicates a tape type such as a print tape for normal label or a print tape for die cut label.

Tape Print System

Figure 4:
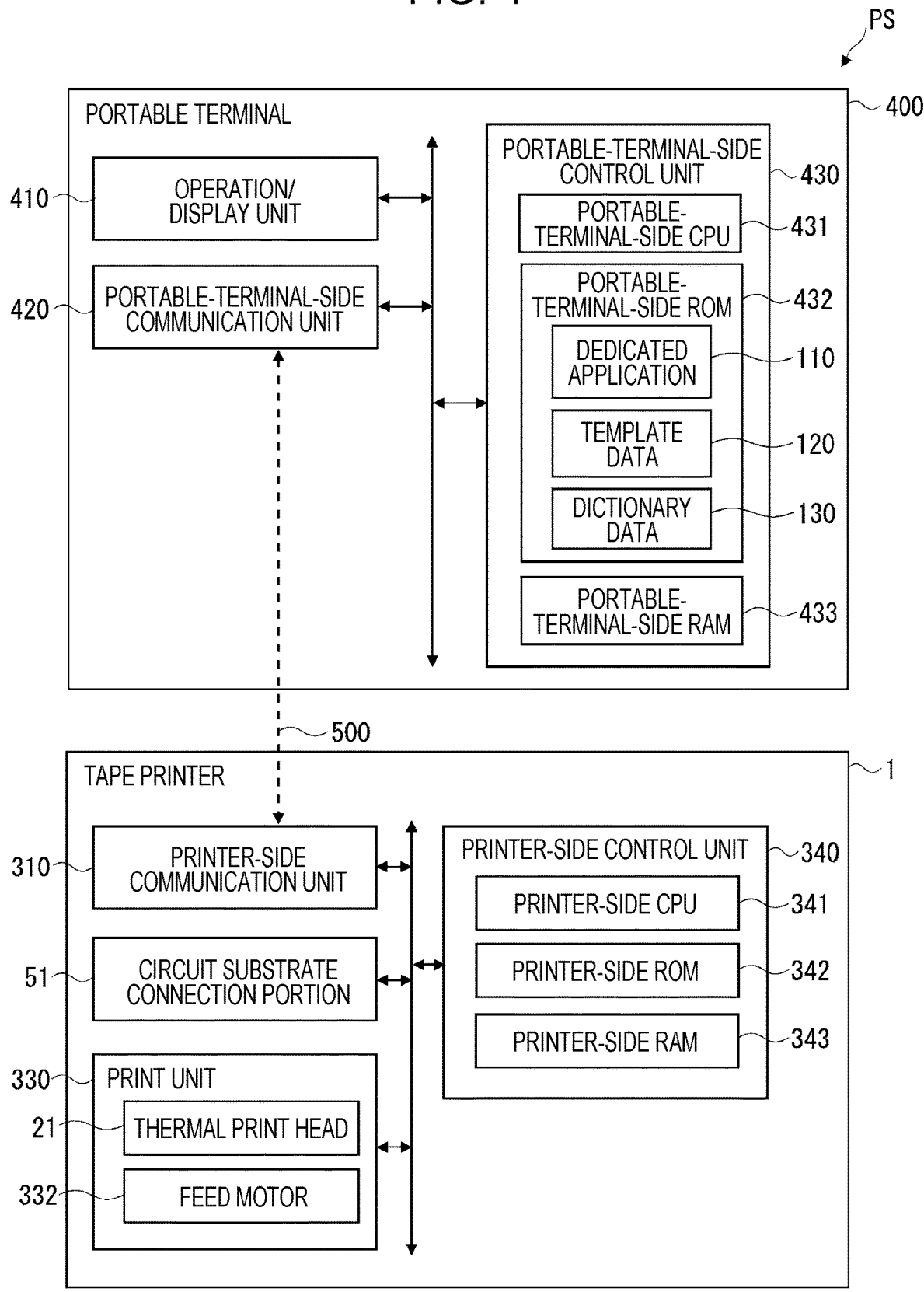
FIG. 4 is a control block diagram of a print system.

FIG. 4 is a block diagram of a print system PS. The print system PS includes the portable terminal 400 and the tape printer 1, which are connected via a wireless communication network 500. Note that, the portable terminal 400 and the tape printer 1 may be connected via a wired communication network such as a cable communication network, in place of the wireless communication network 500.

The portable terminal 400 is, for example, a smartphone and includes an operation/display unit 410, a portable-terminal communication unit 420, and a portable-terminal control unit 430. The operation/display unit 410 is one example of the "display unit". The portable-terminal communication unit 420 is one example of the "transmission unit".

The operation/display unit 410 is, for example, a touch panel, and is used to input various operations by a user and display various kinds of information. The operation/display unit 410 displays various screens, such as a template list screen D1 shown in FIG. 8, a template search screen D2 shown in FIG. 9, and a label edit screen D3 shown in FIG. 10. The template list screen D1 is for selecting a template for creating a label. The template search screen D2 is for searching a template. The label edit screen D3 is for editing a label and making a print instruction.

The portable-terminal communication unit 420 communicates with the tape printer 1 via the wireless communication network 500. For example, the portable-terminal communication unit 420 transmits print data to the tape printer 1 and receives cartridge information from the tape printer 1.

The portable-terminal control unit 430 includes a portable-terminal central processing unit (CPU) 431, a portable-terminal read only memory (ROM) 432, and a portable-terminal random access memory (RAM) 433. The portable-terminal ROM 432 is one example of the "storage unit".

The portable-terminal CPU 431 performs various controls by expanding and executing various control programs stored in the portable-terminal ROM 432 in the portable-terminal RAM 433. Note that, in the portable-terminal control unit 430, a hardware circuit such as an application specific integrated circuit (ASIC) may be used as a processor in place of the portable-terminal CPU 431. In addition, one or more CPUs and hardware circuits, such as ASICs, may operate in cooperation with each other so that they function like a processor.

The portable-terminal ROM 432 stores various control programs and various kinds of control data. For example, the portable-terminal ROM 432 stores an operation system (OS), which is not shown, a dedicated application 110, template data 120, and dictionary data 130. The dedicated application 110 is one example of the "program".

The dedicated application 110 is an application for smartphones for controlling the tape printer 1, and is installed in the portable terminal 400 from a predetermined server. The template list screen D1, the template search screen D2, and the label edit screen D3 are displayed based on the dedicated application 110.

Meanwhile, the template data 120 and the dictionary data 130 are installed when the dedicated application 110 is installed in the portable terminal 400. Note that, the template data 120 and the dictionary data 130 may be installed in the portable terminal 400 as a part of the dedicated application 110. In addition, as the dictionary data 130, dictionary data included in the OS of the portable terminal 400 may be used.

Figure 8:
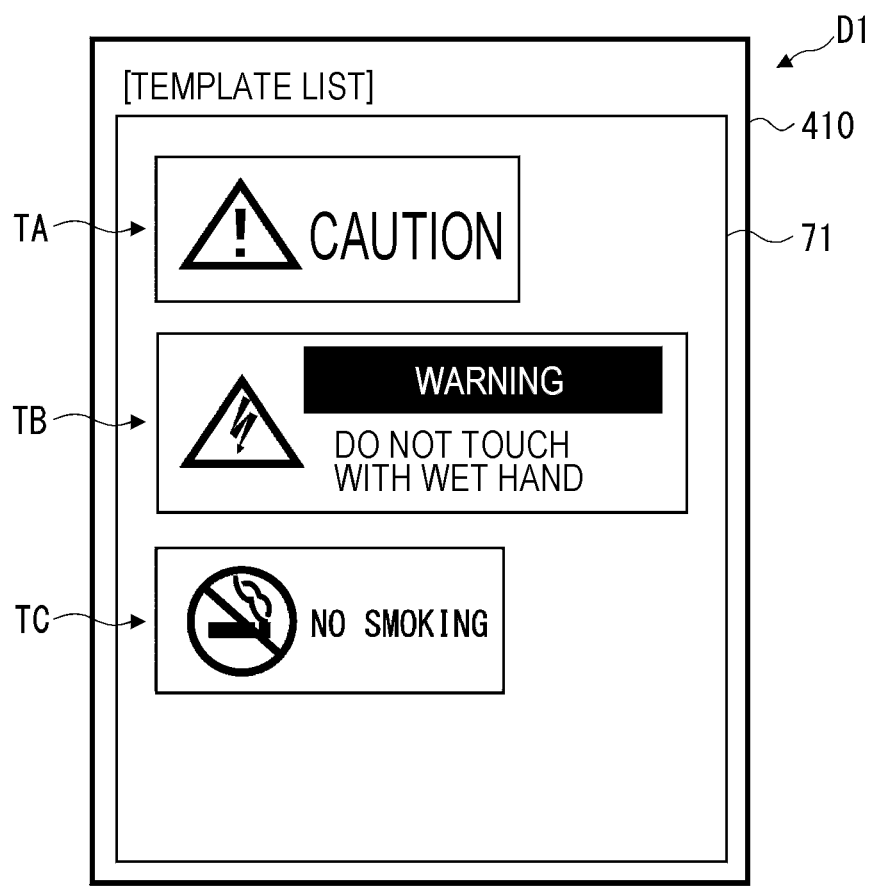
FIG. 8 shows a display example of a template list screen.

The template data 120 is data in which, for each template, image data of the template and a related text are associated with each other. FIG. 5 is an explanatory drawing of the template data 120. In the example of FIG. 5, a template A (TA) shown in FIG. 8 is associated with a text "caution" as a related text. Similarly, a template B (TB) shown in FIG. 8 is associated with a text "warning" as a related text, and a template C (TC) shown in FIG. 8 is associated with a text "no smoking" as a related text. The related texts shown in FIG. 5 are default information that is stored in the template data 120 in advance. Note that, as default information, a plurality of related texts may be associated with one template.

Figure 10:
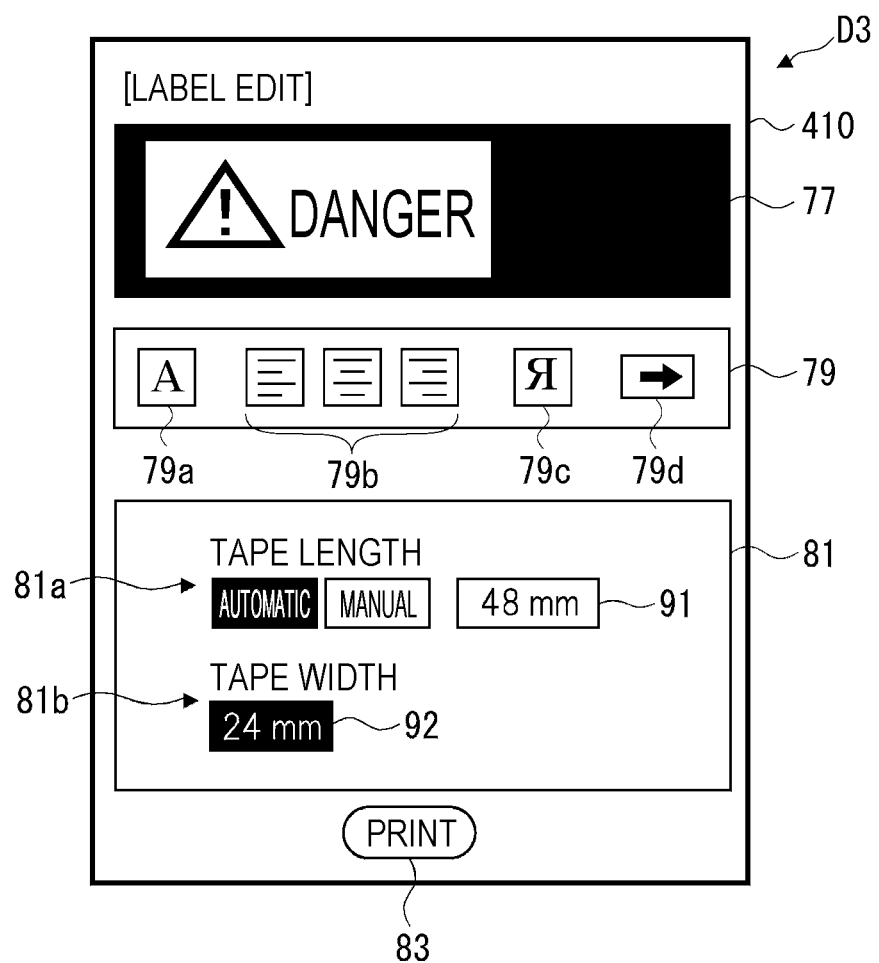
FIG. 10 shows a display example of a label edit screen.

Meanwhile, when label editing and a print instruction are executed while a template is used in the label edit screen D3, the portable-terminal CPU 431 stores the text that is input in the template in the template data 120 as a related text. FIG. 6 shows a state in which a related text is added to the template data 120 of FIG. 5. The example of FIG. 6 indicates a state in which a text "danger" is added as a related text to the template data 120 shown in FIG. 5 when the text "danger" is input in the template A (TA) as shown in FIG. 10. In this manner, when label editing and a print instruction are executed while a template is used and when a text that is input in the template is not stored in the template data 120 as a related text of the template, the portable-terminal CPU 431 adds the related text to the template data 120.

Note that, although only two new related texts can be added for each template in the examples of FIGS. 5 and 6, the template data 120 may be configured to hold more related texts for each template. In addition, when the number of related texts exceeds a maximum storage number for related texts, the portable-terminal CPU 431 may delete added related texts in order from the oldest while keeping related texts of default information. Alternatively, the portable-terminal CPU 431 stores the number of times that the same text as an added related text was input for each template, and when the number of related texts exceeds the maximum storage number, the portable-terminal CPU 431 may delete added related texts in order from the smallest number of input times.

Now, return to the explanation of FIG. 4. The dictionary data 130 is data in which a plurality of terms are registered. Note that a "term" consists of spoken sounds and has understandable meaning in society. For example, "terms" include words, idioms, sentences, phrases, and proverbs.

The portable-terminal CPU 431 stores, as a related text, a term that is included in the text input in a template and has been registered in the dictionary data 130. For example, when a text "it's danger" is input in a template and when the term "danger" has been registered in the dictionary data 130 but not the term "it's danger", the term "danger" is stored as a related text by the portable-terminal CPU 431.

The portable-terminal RAM 433 is used as a work area for the portable-terminal CPU 431 to perform various controls.

The tape printer 1 includes a printer communication unit 310, the circuit substrate connection portion 51, a print unit 330, and a printer control unit 340. The printer communication unit 310 is one example of the "reception unit".

The printer communication unit 310 communicates with the portable terminal 400 via the wireless communication network 500. For example, the printer communication unit 310 receives print data from the portable terminal 400 and transmits cartridge information to the portable terminal 400.

The circuit substrate connection portion 51 is connected to the circuit substrate 200 shown in FIG. 2 and reads cartridge information from the circuit substrate 200.

The print unit 330 is a mechanism for printing on the print tape 213, and includes the thermal print head 21 and a feed motor 332. The thermal print head 21 is provided with a plurality of heating elements and is used to thermally transfer ink from the ink ribbon 217 to the print tape 213 during printing. The feed motor 332 is a driving source for driving the platen roller 205.

The printer control unit 340 includes a printer CPU 341, a printer ROM 342, and a printer RAM 343.

The printer CPU 341 performs various controls by expanding and executing various control programs stored in the printer ROM 342, in the printer RAM 343. Note that, in the printer control unit 340, a hardware circuit such as an ASIC may be used as a processor in place of the printer CPU 341. In addition, one or more CPUs and hardware circuits, such as ASICs, may operate in cooperation with each other so that they function like a processor.

The printer ROM 342 stores various control programs and various kinds of control data. In addition, the printer RAM 343 is used as a work area for the printer CPU 341 to perform various controls.

The printer CPU 341 uses control programs stored in the printer ROM 342 to perform printing on the print tape 213 based on the print data transmitted from the portable terminal 400. More specifically, the printer CPU 341 performs printing by controlling current application to the plurality of heating elements provided in the thermal print head 21 and driving of the feed motor 332 in conjunction with each other.

In addition, when cartridge information is requested from the portable terminal 400 or when the ribbon cartridge 201 is replaced, the printer CPU 341 obtains cartridge information from the circuit substrate 200 via the circuit substrate connection portion 51 and transmits the obtained cartridge information to the portable terminal 400.

Functional Configuration of Portable Terminal

Figure 7:
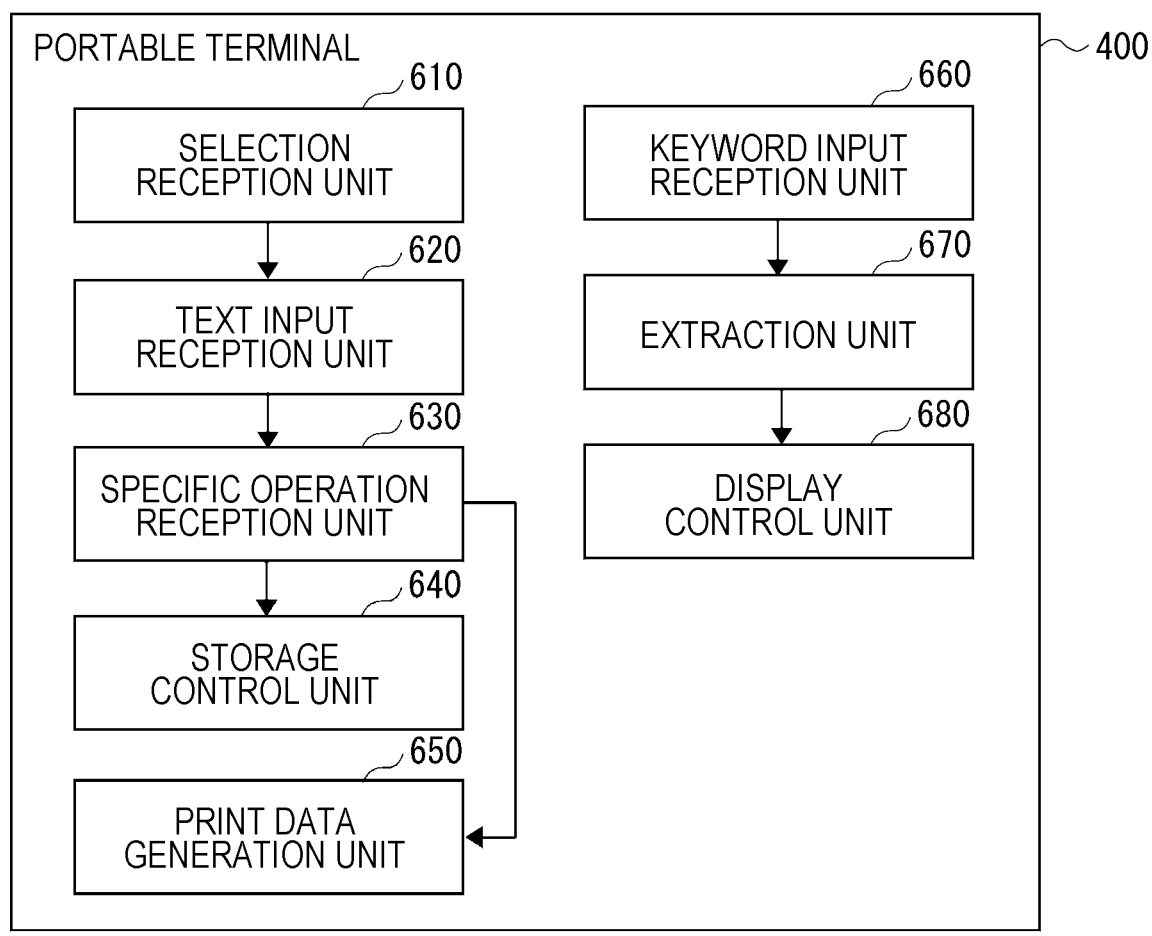
FIG. 7 is a functional block diagram of a portable terminal.

FIG. 7 is a functional block diagram of the portable terminal 400. The portable terminal 400 includes a selection reception unit 610, a text input reception unit 620, a specific operation reception unit 630, a storage control unit 640, a print data generation unit 650, a keyword input reception unit 660, an extraction unit 670, and a display control unit 680. These functions are implemented by executing the dedicated application 110 by the portable-terminal CPU 431.

The selection reception unit 610 receives selection of a template from available templates. The selection reception unit 610 receives selection of a template in a template list screen D1 shown in FIG. 8 and in a template search screen D2 shown in FIG. 9.

The text input reception unit 620 receives an input of a text into the template selected at the selection reception unit 610. The text input reception unit 620 receives an input of a text in a label edit screen D3 shown in FIG. 10.

The specific operation reception unit 630 receives a specific operation to store a related text in the template data 120. The specific operation reception unit 630 receives a print instruction as a specific operation in the label edit screen D3 shown in FIG. 10.

The storage control unit 640 stores, in the template data 120, a related text that is at least a part of the text input at the text input reception unit 620, in association with the template selected at the selection reception unit 610. The storage control unit 640 stores a related text when the specific operation reception unit 630 receives a specific operation. That is, when the specific operation reception unit 630 receives a specific operation, the storage control unit 640 stores at least a part of the input text received by the text input reception unit 620, as a related text. In addition, the storage control unit 640 determines which part of the input text to be stored as a related text by referring to the dictionary data 130. That is, the storage control unit 640 stores, as a related text, a term that is included in the text input at the text input reception unit 620 and has been registered in the dictionary data 130.

When the specific operation reception unit 630 receives a print instruction as a specific instruction, the print data generation unit 650 generates print data for creating a label based on the template selected at the selection reception unit 610 and the text input at the text input reception unit 620. A label is created by the tape printer 1 by printing a print image on the print tape 213 based on the print data.

The keyword input reception unit 660 receives an input of a search keyword for searching a template. The keyword input reception unit 660 receives an input of a search keyword in the template search screen D2 shown in FIG. 9.

The extraction unit 670 extracts, from the template data 120, templates with which a related text corresponding to the input search keyword is associated.

The display control unit 680 displays, as available templates for selection, the templates extracted by the extraction unit 670 on the operation/display unit 410. The display control unit 680 displays, as available templates for selection, the templates extracted by the extraction unit 670 in the template search screen D2.

Template List Screen, Template Search Screen, and Label Edit Screen

FIG. 8 shows a display example of the template list screen D1. The template list screen D1 is displayed when, for example, a menu "template list" is selected in a menu selection screen (not shown) of the dedicated application 110. The template list screen D1 includes an available template display area 71.

On the available template display area 71, available templates for selection are displayed. When the template data 120 shown in FIG. 5, for example, is stored in the portable-terminal ROM 432, the portable terminal 400 displays three templates, which are the template A (TA), the template B (TB), and the template C (TC), in the available template display area 71.

In addition, the portable terminal 400 displays, in the available template display area 71, available templates for selection in a specific order, such as an order of template category, an order of template identification (ID), which is used to identify templates, or an order of width of the print tape 213 for the templates.

A user selects a template from the available templates displayed in the available template display area 71 by performing a predetermined operation, such as double-tapping, on the position at which a desired template is displayed. The portable terminal 400 displays the label edit screen D3 shown in FIG. 10 when a template is selected in the template list screen D1.

Figure 9:
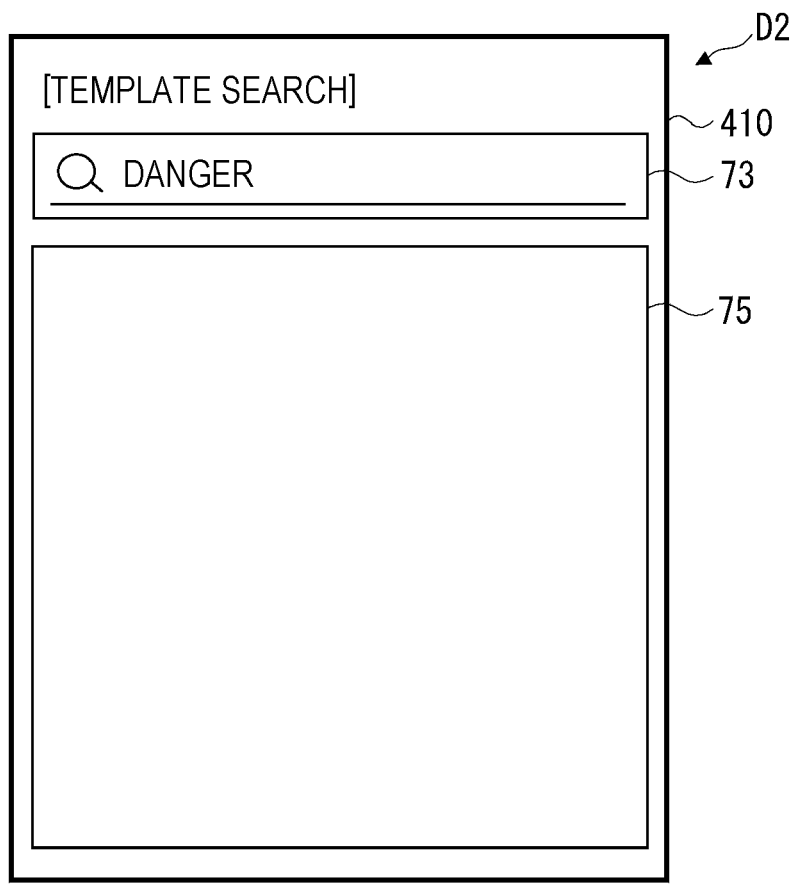
FIG. 9 shows a display example of a template search screen.

FIG. 9 a display example of the template search screen D2. The template search screen D2 is displayed when, for example, a menu "template search" is selected in a menu selection screen (not shown) of the dedicated application 110. The template search screen D2 includes a keyword input area 73 and a search result display area 75. A search keyword is input in the keyword input area 73 by the user by entering characters using a keyboard (not shown). In the example of FIG. 9, a term "danger" is input as a search keyword.

In addition, in the search result display area 75, templates with which a related text corresponding to the search keyword input in the keyword input area 73 is associated, out of the templates stored in the template data 120, are displayed as a search result. When, for example, the template data 120 shown in FIG. 5 is stored in the portable-terminal ROM 432, the portable terminal 400 displays no template as a search result because there is no template that is associated with the term "danger" as a related text.

When the user inputs a search keyword but no template is displayed, like the template search screen D2 of FIG. 9, the user may input a search keyword again, or may close the template search screen D2 and display the template list screen D1 to select a template from available templates displayed in the template list screen D1.

Although not shown in the drawings, when too many templates are displayed in the search result display area 75, the user can add a new search keyword in the keyword input area 73 to narrow down the templates. That is, when multiple search keywords are input in the keyword input area 73, the portable terminal 400 extracts templates by using AND condition based on the input search keywords and displays the extracted templates in the search result display area 75.

FIG. 10 shows a display example of the label edit screen D3. The label edit screen D3 is displayed when, for example, a menu "label edit" is selected in a menu selection screen (not shown) of the dedicated application 110. The label edit screen D3 is also displayed when a template is selected in the template list screen D1 or the template search screen D2. In this case, the selected template is displayed in an edit area 77, which will be described later. The label edit screen D3 includes the edit area 77, an edit function selection area 79, a tape size area 81, and a print button 83.

In the edit area 77, an edit result of label editing is displayed. The label editing is editing of print data for creating a label. The example of FIG. 10 shows a state in which the template A (TA) shown in FIG. 8 is selected and the text "caution" included in the template A (TA) is changed to a text "danger". The text "danger" is one example of input texts received by the text input reception unit 620.

The edit function selection area 79 includes a font icon 79a, a group of alignment icons 79b, a mirror character icon 79c, and a character direction icon 79d. The font icon 79a is used to change the font of a text to be input in the edit area 77. The alignment icons 79b are used to "left-align", "center", or "right-align" lines of texts when multiple lines of texts are input in the edit area 77. The mirror character icon 79c is used to switch the form of the text input in the edit area 77 between normal writing and mirror writing. The character direction icon 79d is used to switch a text input in the edit area 77 between vertical writing and horizontal writing.

The tape size area 81 includes a tape length area 81a and a tape width area 81b. An automatic setting or a manual setting is selected in the tape length area 81a to set the length of the print tape 213, that is, the length of a label. When the automatic setting is selected, the portable terminal 400 displays a tape length calculated according to the edit result of the edit area 77, in a first numeric field 91. When the manual setting is selected, the user inputs a desired length for a label in the first numeric field 91. In this case, the portable terminal 400 generates print data so that a label has the length input in the first numeric field 91. Note that the portable terminal 400 may generate print data including data for printing a cut mark that indicates a cutting position of the print tape 213. In addition, when the tape printer 1 has an automatic cutting function, the portable terminal 400 may generate print data including a cut instruction command.

In the tape width area 81b, the width of the print tape 213 is displayed in a second numeric field 92. In the second numeric field 92, the portable terminal 400 displays the width of the print tape 213, the width being included in the cartridge information received from the tape printer 1. In addition, when the user performs a specific operation such as touching on the second numeric field 92, the portable terminal 400 requests the latest cartridge information from the tape printer 1 and updates display contents in the second numeric field 92 based on the cartridge information received from the tape printer 1.

The print button 83 is used to issue a print instruction. When the print button 83 is selected, the portable terminal 400 generates print data according to the edit result of the edit area 77 and transmits the generated print data to the tape printer 1. In addition, when the print button 83 is selected and when a text, other than the texts that have been stored as related texts, is input in the template in the edit area 77, the portable terminal 400 stores at least a part of the text as a related text in the template data 120. In the example of FIG. 10, the portable terminal 400 stores the text "danger" in the template data 120 in association with the template A (TA), as shown in FIG. 6.

Figure 11:
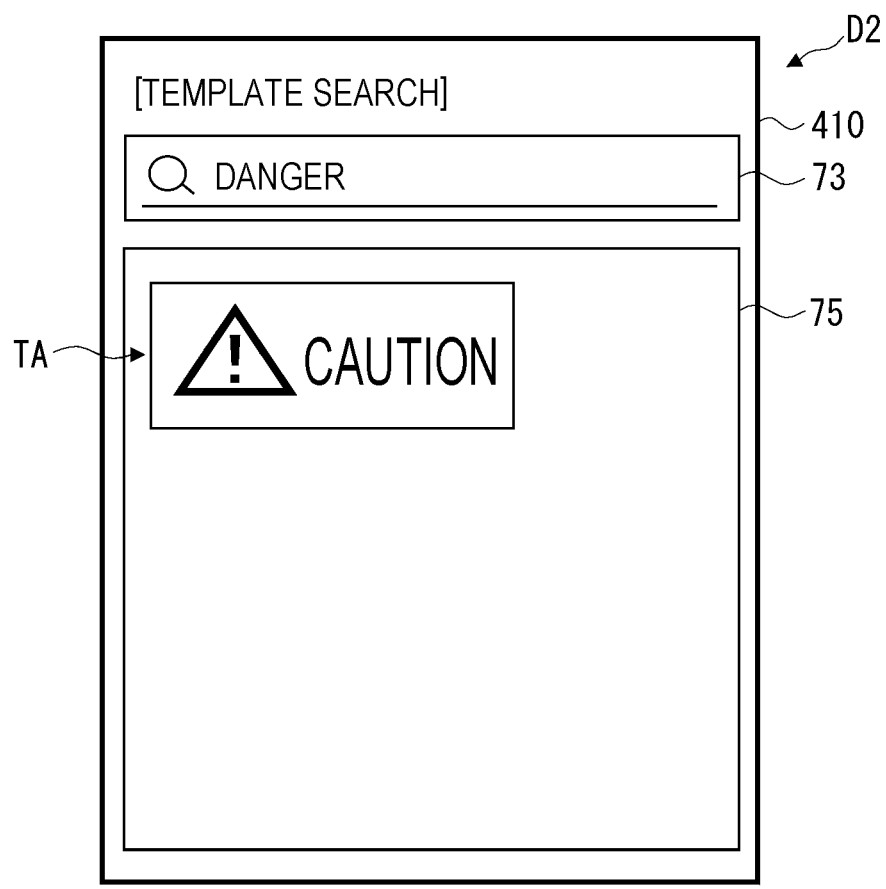
FIG. 11 is another display example of the template search screen, which is different from that of FIG. 9.

FIG. 11 is another display example of the template search screen D2 in a case where the template data 120 shown in FIG. 6 is stored in the portable-terminal ROM 432 and a text "danger" is input as a search keyword. In this case, because the template A (TA) with which the term "danger" is associated as a related text is present in the template data 120, the portable terminal 400 displays the template A (TA) in the search result display area 75 as a result of template search.

When the user selects the template A (TA) displayed in the search result display area 75 by double-tapping thereon or another operation, the portable terminal 400 displays the label edit screen D3. In this case, the portable terminal 400 displays the template A (TA) in the edit area 77 of the label edit screen D3.

Print Data Transmission Processing

Figure 12:
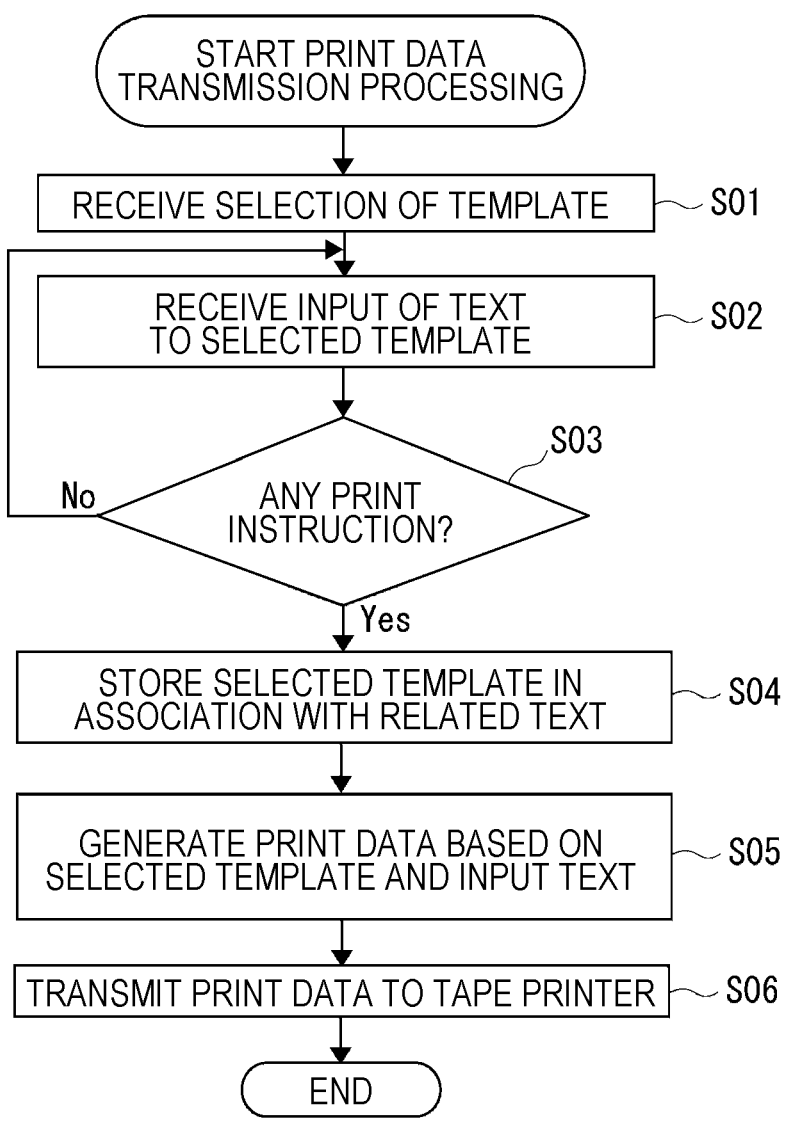
FIG. 12 is a flowchart showing the flow of print data transmission processing.

FIG. 12 is a flowchart showing the flow of print data transmission processing. Upon reception of template selection in the available template display area 71 of the template list screen D1 or in the search result display area 75 of the template search screen D2, as a trigger, the portable terminal 400 performs step S02 and the subsequent steps.

In step S01, the portable terminal 400 receives selection of a template.

In step S02, the portable terminal 400 receives an input of a text into the selected template. The portable terminal 400 receives an input of a text in the label edit screen D3 shown in FIG. 10.

In step S03, the 400 determines whether or not a print instruction is issued. The portable terminal 400 receives a print instruction in the label edit screen D3. When the portable terminal 400 determines that a print instruction is issued, the process proceeds to step S04. When the portable terminal 400 determines that no print instruction is issued, the process returns to step S02.

In step S04, the portable terminal 400 stores, in the template data 120, the template selected in step S01 in association with a related text, which is at least a part of the text input in step S02.

In step S05, the portable terminal 400 generates print data based on the template selected in step S01 and the text input in step S02.

In step S06, the portable terminal 400 transmits the print data generated in step S05 to the tape printer 1.

Template Search Processing

Figure 13:
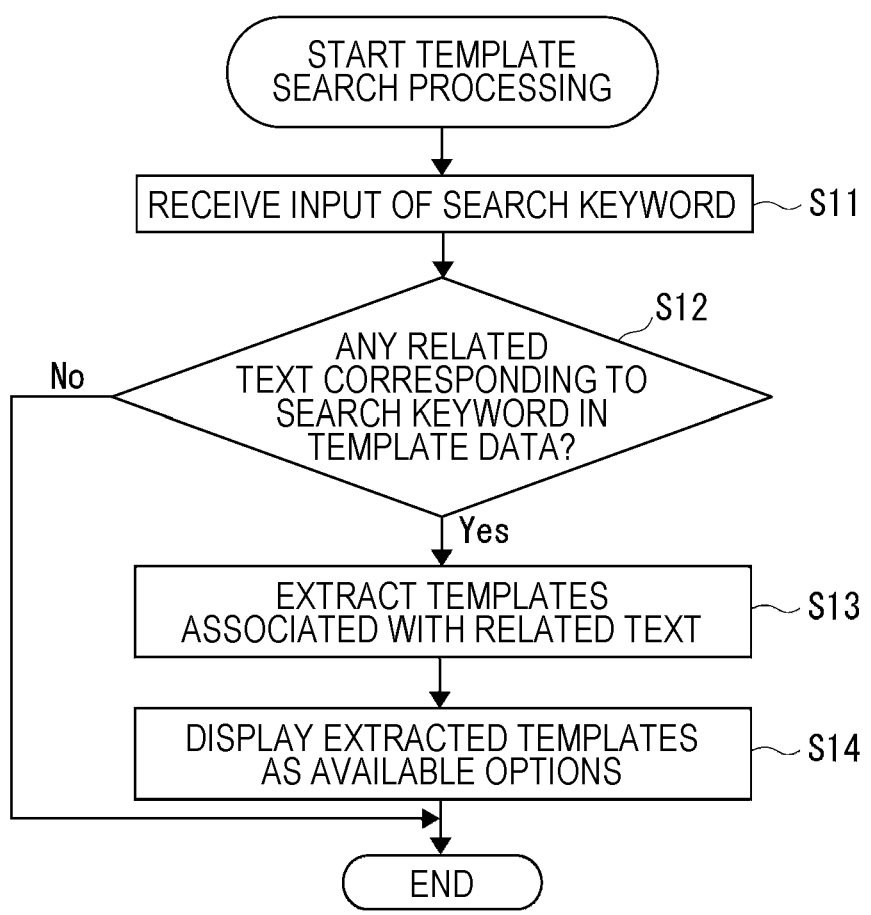
FIG. 13 is a flowchart showing the flow of template search processing.

FIG. 13 is a flowchart showing the flow of template search processing. Upon reception of a search keyword input in the keyword input area 73 in the template search screen D2, as a trigger, the portable terminal 400 performs step S12 and the subsequent steps. Note that the portable terminal 400 determines that an input of a search keyword is received when entry of a text into the keyword input area 73 is confirmed.

In step S11, the portable terminal 400 receives an input of a search keyword.

In step S12, the portable terminal 400 determines whether or not a related text corresponding to the search keyword input in step S11 is present in the template data 120 stored in the portable-terminal ROM 432. The portable terminal 400 determines that a related text corresponding to the search keyword is present, the process proceeds to step S13. When the portable terminal 400 determines that no related text corresponding to the search keyword is present, the portable terminal 400 terminates the template search processing. Note that, when the portable terminal 400 receives an input of an additional search keyword in the template search screen D2 after terminating the template search processing, the portable terminal 400 resumes the template search processing.

In step S13, the portable terminal 400 extracts, from the template data 120, a template with which a related text corresponding to the search keyword input in step S11 is associated.

In step S14, the portable terminal 400 displays the template extracted in step S13 as an available template. The portable terminal 400 displays the template extracted in step S13 in the search result display area 75 of the template search screen D2.

As described above, the portable terminal 400 according to the present embodiment stores at least a part of the input text in association with the selected template in the template data 120 as a related text. Then, when receiving an input of a search keyword for searching a template, the portable terminal 400 extracts a template with which a related text corresponding to the search keyword is associated and displays the extracted template as an available template. With this configuration, the user can search a template based on the text that the user input when the user used the template before. Consequently, time and effort of the user in searching the template can be reduced.

Moreover, because the portable terminal 400 stores, as a related text, at least a part of the text input in the template in the template data 120 when receiving an print instruction, no special operation is required to store the related text.

Note that, regardless of the embodiment above, the following modified examples can be employed.

Modified Example 1

Although the portable terminal 400 in the above embodiment stores the template data 120 in the own portable-terminal ROM 432, the template data 120 may be stored in an external device. For example, the template data 120 may be stored in a server on the Internet and the portable terminal 400 may write and read the template data 120 by communicating with the server.

Modified Example 2

Figure 14:
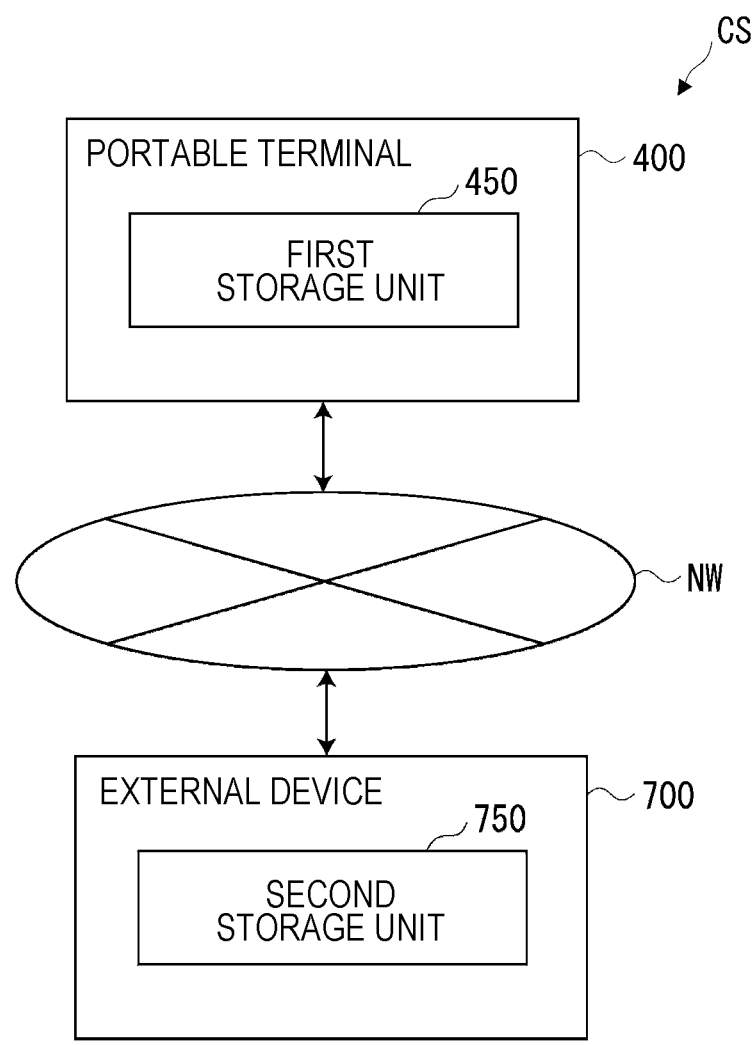
FIG. 14 shows a system configuration of a communication system according to a modified example.

Related texts may be stored in an external device, such as a server, while templates are stored in the portable terminal 400. FIG. 14 shows a system configuration of a communication system CS according to the present modified example. The communication system CS includes the portable terminal 400 and an external device 700, and the portable terminal 400 and the external device 700 are configured to communicate with each other via a network NW. The portable terminal 400 includes a first storage unit 450. In the first storage unit 450, image data of a template and an ID of the template for identify the template are stored in association with each other. The external device 700 includes a second storage unit 750. In the second storage unit 750, a template ID and a related text are stored in association with each other.

In this configuration, the storage control unit 640, shown in FIG. 7, of the portable terminal 400 stores the template ID of the selected template in association with a related text, in the second storage unit 750 of the external device 700. In addition, the extraction unit 670, shown in FIG. 7, of the portable terminal 400 identifies the template ID of a template, with which a related text corresponding to the input search keyword is associated, in the second storage unit 750, and extracts a template with which the identified template ID is associated, from the first storage unit 450 of the portable terminal 400.

According to this configuration, because the second storage unit 750 is provided in the external device 700, the portable terminal 400 can accomplish the abovementioned embodiment even when the capacity of the own storage medium is small. In addition, by allowing the external device 700 to communicate with a plurality of the portable terminals 400, more related texts can be associated with one template, and thus faster search of a template can be attained.

Note that the portable terminal 400 and the external device 700 may be connected via a wireless communication or a cable communication, instead of the network NW. In addition, the external device 700 may be a removal storage medium that can be attached to the portable terminal 400.

As another example, the portable terminal 400 may be provided with the second storage unit 750 and the external device 700 may be provided with the first storage unit 450. Furthermore, a first external device (not shown) that can communicate with the portable terminal 400 may be provided with the first storage unit 450 and a second external device (not shown) that can communication with the portable terminal 400 and is different from the first external device may be provided with the second storage unit 750.

Modified Example 3

Although, in the above embodiment, the portable terminal 400 stores at least a part of a text input in a template, in the template data 120 as a related text when receiving a print instruction, the related text may be stored when a specific operation, other than the print instruction, is performed. For example, a prescribed button for storing a related text may be displayed in the label edit screen D3 and a related text may be stored when the prescribed button is selected. In addition, when the portable terminal 400 is provided with a detection unit such as a gyroscopic sensor, a related text may be stored when the portable terminal 400 detects a tilt or a shake of the portable terminal 400.

As another example, the portable terminal 400 may store at least a part of a text input in a template, as a related text when entry of the text input in the template in the edit area 77 of the label edit screen D3 is confirmed. Alternatively, the portable terminal 400 may periodically monitor an edit content in the edit area 77 and, when any text is input, the portable terminal 400 may store the text as a related text.

Modified Example 4

Although, in the above embodiment, a case where a word "danger" is input as a text to be input in a template, is explained, a related text may be stored by considering declension/conjugation of adjectives/verbs when a sentence is input as a text. More specifically, when the sentence includes a word that is a verb or an adjective having a conjugation/declension form, the portable terminal 400 may change the form of the word into the plain form, and then when the word, the form of which has been changed, is included in the dictionary data 130, the portable terminal 400 may store the word as a related text. For example, when a text "do not touch with wet hands" is input, the words "wet", "hand", and "touch" can be stored as related texts.

Note that, in this case, a word, the form of which has been changed into the plain form, is included in the "at least a part of the text that is input and received" that the storage control unit 640 stores.

In addition, as another example, the storage control unit 640 may store a related text without using the dictionary data 130. In this case, the storage control unit 640 may store an input text as it is, as a related text.

Modified Example 5

Instead of a template with which a related text that matches with a search keyword input in the template search screen D2 is associated, a template with which a related text that corresponds to the search keyword is associated may be extracted. For example, when a sentence is input as a search keyword and a word included in the sentence has a conjugation/declension form, the portable terminal 400 changes the form of the word into the plain form, and when the template data 120 includes the word, the form of which has been changed, as a related text, the portable terminal 400 may extract a template with which the related text is associated.

In addition, as another example, the portable terminal 400 stores secondary dictionary data in which synonyms are registered, and extracts a template by using, in addition to a search keyword, a synonym of the search keyword. That is, when a search keyword is input, a term similar to the term input as the search keyword is read from the secondary dictionary data, and when either the term input as the search keyword or the term read from the secondary dictionary data is included in the template data 120 as a related text, the portable terminal 400 may extract a template with which the related text is associated.

As described above, examples of the "related text corresponding to a search keyword" include, in addition to a related text that matches with the input search keyword, a related text that matches with a word in the search keyword, the form of which has been changed into the plain form, and a related text that matches with a synonym of the search keyword.

Modified Example 6

Although, in the above embodiment, a case where a text that has been input as a default in a template is edited is explained as editing of a template, an image other than a text may be edited. For example, in the template A (TA) shown in FIG. 8, a mark having an exclamation mark in a triangle may be deleted and another mark may be input.

Modified Example 7

The display format for displaying templates in the available template display area 71 of the template list screen D1 and that in the search result display area 75 of the template search screen D2 may be changed according to the width of the print tape 213 included in the cartridge information received from the tape printer 1. For example, when the width of the print tape 213 included in the cartridge information is "24 mm", the portable terminal 400 may display a template for a tape width larger than 24 mm with a warning mark. Alternatively, when the width of the print tape 213 included in the cartridge information is "24 mm", the portable terminal 400 may display a template for a tape width larger than 24 mm in a grayed-out state so that the user cannot select the template.

As another example, when the width of the print tape 213 included in the cartridge information is "24 mm", the portable terminal 400 may hide a template for a tape width larger than 24 mm.

Modified Example 8

Editing of the template data 120 may be allowed to the user. In this case, the portable terminal 400 may display, for example, image data of a template and a related text in association with each other and may allow the user to delete, add, and modify the related text.

Modified Example 9

In the available template display area 71 of the template list screen D1 and in the search result display area 75 of the template search screen D2, the portable terminal 400 may display available templates in descending order of the number of related texts associated with each template.

In addition, the portable terminal 400 may display available templates in descending order of the date and time that a related text was added to each template.

The portable terminal 400 may display available templates according to the initial characters of the related texts. For example, the portable terminal 400 may display available templates in the order of Japanese alphabet or English alphabet according to the initial characters of the related texts.

The portable terminal 400 may display each available template with its related text(s).

Modified Example 10

Although, in the above embodiment, the portable terminal 400 generates print data, the tape printer 1 may generate print data. In this case, the tape printer 1 may include an operation unit including a keyboard or another device and a display unit that displays screens, such as the template list screen D1 shown in FIG. 8, the template search screen D2 shown in FIG. 9, and the label edit screen D3 shown in FIG. 10. In addition, the operation unit and the display unit may be provided in the tape printer 1 as a touch panel. Note that, in the present modified example, the tape printer 1 is one example of the "template processing device".

Modified Example 11

The dedicated application 110 of the portable terminal 400 shown in the above embodiment may be executed at a server on the Internet, and searching of a template and editing of print data may be performed by the portable terminal 400 and the server in cooperation with each other. The portable terminal 400 may be a tablet terminal, in place of a smartphone. In place of the portable terminal 400, a personal computer (PC) may be used as the "information processing terminal".

Modified Example 12

Although, in the above embodiment, a case of searching for a template for creating a label is explained, the above embodiment is not limited to searching of a template for creating label, and may be applied in searching for other templates, such as a template for creating a document and a template for creating a postcard. In addition, in the above embodiment, the tape printer 1 performs thermal transfer printing, however, the tape printer 1 may perform printing by an ink jet system or another printing system. Other than the above, various modifications are conceivable within the scope of the present disclosure.

Supplementary Note

Supplementary note of the template processing device, the print system, the processing method of the template processing device and the non-transitory computer-readable storage medium storing a program will be given below.

The template processing device includes the selection reception unit 610 that receives selection of a template from available templates, the text input reception unit 620 that receives an input of a text into the selected template, the storage control unit 640 that stores, in the portable-terminal ROM 432, the selected template and a related text that is at least a part of the input text, in association with each other, the keyword input reception unit 660 that receives an input of a search keyword for searching the template, the extraction unit 670 that extracts, from the portable-terminal ROM 432, the template with which the related text corresponding to the input search keyword is associated, and the display control unit 680 that displays the extracted template on the operation/display unit 410 as an available template.

The print system includes the portable terminal 400 and the tape printer 1. The portable terminal 400 includes the selection reception unit 610 that receives selection of a template from available templates, the text input reception unit 620 that receives an input of a text into the selected template, the storage control unit 640 that stores, in the portable-terminal ROM 432, the selected template and a related text that is at least a part of the input text, in association with each other, the keyword input reception unit 660 that receives an input of a search keyword for searching the template, the extraction unit 670 that extracts, from the portable-terminal ROM 432, the template with which the related text corresponding to the input search keyword is associated, the display control unit 680 that displays the extracted template on the operation/display unit 410 as an available template, the print data generation unit 650 that generates print data by using the template that is selected from the available templates, and the portable-terminal communication unit 420 that transmits the generated print data to the tape printer 1. The tape printer 1 includes the printer communication unit 310 that receives the print data from the portable terminal 400 and the print unit 330 that performs printing based on the received print data.

The processing method of the template processing device executes processing including receiving selection of a template from available templates, receiving an input of a text into the selected template, storing, in the portable-terminal ROM 432, the selected template and a related text that is at least a part of the input text, in association with each other, receiving an input of a search keyword for searching the template, extracting, from the portable-terminal ROM 432, the template with which the related text corresponding to the input search keyword is associated, and displaying the extracted template on the operation/display unit 410 as an available template.

The non-transitory computer-readable storage medium storing a program for causing the template processing device to execute processing including receiving selection of a template from available templates, receiving an input of a text into the selected template, storing, in the portable-terminal ROM 432, the selected template and a related text that is at least a part of the input text, in association with each other, receiving an input of a search keyword for searching the template, extracting, from the portable-terminal ROM 432, the template with which the related text corresponding to the input search keyword is associated, and displaying the extracted template on the operation/display unit 410 as an available template.

According to the above configurations, the template processing device stores, in the portable-terminal ROM 432, the selected template and the related text, which is at least a part of the input text, in association with each other, extracts, when an input of a search keyword for searching the template is received, the template with which the related text corresponding to the search keyword is associated, and displays the extracted template on the operation/display unit 410 as an available template. Consequently, the user can search a template based on the text that the user input in the template when the user used the template before and, as a result, time and effort of the user in searching the template can be reduced.

The template processing device described above may further include the specific operation reception unit 630 that receives a specific operation. The storage control unit 640 may store, in the portable-terminal ROM 432, at least a part of the input text received by the text input reception unit 620, as the related text when the specific operation is received.

According to this configuration, the template processing device can store at least a part of the input text in the portable-terminal ROM 432 as the related text when the specific operation is received.

In the template processing device described above, the specific operation may be a print instruction. The template processing device may further include the print data generation unit 650 that generates print data based on the selected template and the input text, according to the print instruction.

According to this configuration, the template processing device can store at least a part of the input text in the portable-terminal ROM 432 as the related text when the print instruction is received.

In the template processing device described above, the storage unit may include a first storage unit that is provided in the template processing device and stores a template and a template ID for identifying the template in association with each other and a second storage unit that is provided in an external device configured to communicate with the template processing device and stores the template ID and a related text in association with each other. The storage control unit 640 may store the template ID of the selected template and the related text in association with each other in the second storage unit. The extraction unit 670 may identify, in the second storage unit, the template ID with which the related text corresponding to the input search keyword is associated, and extract the template with which the identified template ID is associated from the first storage unit.

According to this configuration, because the second storage unit can be provided in an external device, the template processing device can realize the above features even when the capacity of a storage medium provided in the template processing device is small.

In the template processing device described above, the storage control unit 640 may refer to the dictionary data 130 in which a plurality of terms are registered, and store a term that is included in the input text and is registered in the dictionary data 130 in the portable-terminal ROM 432 as a related text.

According to this confiscation, the template processing device can store a term that is included in the input text and is registered in the dictionary data 130 in the portable-terminal ROM 432 as a related text.

The invention claimed is:

1. A template processing device comprising:
a processor configured to:
receive selection of a template from available templates, the selected template already being associated with a first related text;
receive an input of a text into the selected template;
refer to dictionary data in which a plurality of terms are registered;
upon receipt of a print instruction, store in a memory and in association with each other (i) the selected template and (ii) a second related text, which is based on the input text, is registered in the dictionary data in the memory, and is different from the first related text;
upon receipt of the print instruction, transmit to a printer external to the template processing device print data based on the selected template and the input text;
receive an input of a search keyword for searching the template;
extract, from the memory, the template with which the second related text corresponding to the input search keyword is associated; and
display the extracted template on a display as an available template.

2. The template processing device according to claim 1, wherein
the processor is further configured to generate the print data based on the selected template and the input text, according to the print instruction.

3. The template processing device according to claim 1, wherein
the memory includes
(i) a first memory, which is provided in the template processing device and stores the template and a template identification (ID) for identifying the template in association with each other, and
(ii) a second memory, which is provided in an external device configured to communicate with the template processing device and stores the template ID and the second related text in association with each other,
the processor is configured to store the template ID of the selected template and the second related text in association with each other in the second memory, and
the processor is configured to identify, in the second memory, the template ID with which the second related text corresponding to the input search keyword is associated, and extract the template with which the identified template ID is associated from the first memory.

4. A print system comprising:
an information processing terminal; and
a tape printer, wherein
the information processing terminal includes a processor configured to:
receive selection of a template from available templates, the selected template already being associated with a first related text;
receive an input of a text into the selected template;
refer to dictionary data in which a plurality of terms are registered;
upon receipt of a print instruction, store in a memory and in association with each other (i) the selected template and (ii) a second related text, which is based on the input text, is registered in the dictionary data in the memory, and is different from the first related text;
upon receipt of the print instruction, transmit to the tape printer first print data based on the selected template and the input text;
receive an input of a search keyword for searching the template;
extract, from the memory, the template with which the second related text corresponding to the input search keyword is associated;
display the extracted template on a display as an available template;
generate second print data by using the template that is selected from the available templates; and
transmit the generated second print data to the tape printer, and
the tape printer includes a processor configured to
receive the second print data from the information processing terminal and
perform printing based on the received second print data.

5. A processing method of a template processing device, the method comprising:
receiving selection of a template from available templates, the selected template already being associated with a first related text;
receiving an input of a text into the selected template;
referring to dictionary data in which a plurality of terms are registered;
upon receipt of a print instruction, storing in a memory and in association with each other (i) the selected template and (ii) a second related text, which is based on the input text, is registered in the dictionary data in the memory, and is different from the first related text;
upon receipt of the print instruction, transmitting to a printer external to the template processing device print data based on the selected template and the input text;
receiving an input of a search keyword for searching the template;
extracting, from the memory, the template with which the second related text corresponding to the input search keyword is associated; and
displaying the extracted template on a display as an available template.

6. A non-transitory computer-readable storage medium storing a program, the program causing a template processing device to execute:
receiving selection of a template from available templates, the selected template already being associated with a first related text;
receiving an input of a text into the selected template;
referring to dictionary data in which a plurality of terms are registered;
upon receipt of a print instruction, storing in a memory and in association with each other (i) the selected template and (ii) a second related text, which is based on the input text, is registered in the dictionary data in the memory, and is different from the first related text;
upon receipt of the print instruction, transmitting to a printer external to the template processing device print data based on the selected template and the input text;
receiving an input of a search keyword for searching the template;
extracting, from the memory, the template with which the second related text corresponding to the input search keyword is associated; and displaying the extracted template on a display as an available template.

\* \* \* \* \*